United States Patent
Krishan

(10) Patent No.: US 11,290,549 B2
(45) Date of Patent: Mar. 29, 2022

(54) METHODS, SYSTEMS, AND COMPUTER READABLE MEDIA FOR OPTIMIZED NETWORK FUNCTION (NF) DISCOVERY AND ROUTING USING SERVICE COMMUNICATIONS PROXY (SCP) AND NF REPOSITORY FUNCTION (NRF)

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/001,599

(22) Filed: Aug. 24, 2020

(65) Prior Publication Data

US 2022/0060547 A1 Feb. 24, 2022

(51) Int. Cl.
- *H04L 29/08* (2006.01)
- *H04L 67/51* (2022.01)
- *H04L 67/56* (2022.01)

(52) U.S. Cl.
CPC ........ *H04L 67/16* (2013.01); *H04L 29/08648* (2013.01); *H04L 29/08702* (2013.01); *H04L 67/28* (2013.01)

(58) Field of Classification Search
None
See application file for complete search history.

(56) References Cited

U.S. PATENT DOCUMENTS

| | | | |
|---|---|---|---|
| 6,014,558 A | 1/2000 | Thomas | |
| 6,725,278 B1 | 4/2004 | Gonzalez | |

(Continued)

FOREIGN PATENT DOCUMENTS

| | | |
|---|---|---|
| CN | 105635345 B | 2/2019 |
| CN | 109788078 A | 5/2019 |

(Continued)

OTHER PUBLICATIONS

Commonly-assigned, U.S. Appl. No. 17/082,871 for "Methods, Systems, and Computer Readable Media for Rank Processing for Network Function Selection," (Unpublished, filed Oct. 28, 2020).

(Continued)

*Primary Examiner* — Lance Leonard Barry
(74) *Attorney, Agent, or Firm* — Jenkins, Wilson, Taylor & Hunt, P.A.

(57) ABSTRACT

A method for optimized NF discovery and routing includes, at an SCP, receiving a discovery request message or generating a discovery request message in response to a received service request message with a 3gpp-Sbi-Discovery header. The SCP modifies the discovery request message to identify as unhealthy at least one service endpoint and service name combination associated with at least one producer NF instance capable of providing a service identified in the discovery request message or the service request message The SCP forwards the modified discovery request message to the NRF. The NRF creates a list of service profiles of producer NF instances capable of providing the service identified in the modified discovery request message and excludes, from the list, at least one service profile of the at least one producer NF instance corresponding to the endpoint and service name combinations identified as unhealthy in the modified discovery request message.

20 Claims, 9 Drawing Sheets

(56) References Cited

U.S. PATENT DOCUMENTS

| | | | |
|---|---|---|---|
| 6,748,435 | B1 | 6/2004 | Wang et al. |
| 7,151,945 | B2 | 12/2006 | Myles et al. |
| 7,706,822 | B2 | 4/2010 | Emeott et al. |
| 8,306,034 | B2 | 11/2012 | Jang et al. |
| 8,620,858 | B2 | 12/2013 | Backholm et al. |
| 8,767,705 | B2 | 7/2014 | Göppner et al. |
| 8,811,228 | B2 | 8/2014 | Lopez et al. |
| 8,811,372 | B2 | 8/2014 | Li et al. |
| 8,824,449 | B2 | 9/2014 | van der Wateren et al. |
| 9,124,537 | B2 | 9/2015 | Kolze |
| 9,246,762 | B1 | 1/2016 | Watkins |
| 9,386,551 | B2 | 7/2016 | Zhou et al. |
| 9,667,590 | B2 | 5/2017 | Yan et al. |
| 10,097,504 | B2 | 10/2018 | Backholm |
| 10,299,128 | B1 | 5/2019 | Suthar et al. |
| 10,313,362 | B2 | 6/2019 | Ahuja et al. |
| 10,361,843 | B1 | 7/2019 | Suthar et al. |
| 10,595,256 | B1 | 3/2020 | Marupaduga et al. |
| 10,609,154 | B2 | 3/2020 | Talebi Fard et al. |
| 10,616,934 | B2 | 4/2020 | Talebi Fard et al. |
| 10,637,753 | B1 | 4/2020 | Taft et al. |
| 10,652,098 | B2 | 5/2020 | Kim |
| 10,772,062 | B1 * | 9/2020 | Albasheir ............. H04W 60/00 |
| 10,778,527 | B2 | 9/2020 | Assali et al. |
| 10,791,044 | B1 | 9/2020 | Krishan et al. |
| 10,819,636 | B1 | 10/2020 | Goel |
| 10,833,938 | B1 | 11/2020 | Rajput et al. |
| 11,109,307 | B2 | 8/2021 | Bartolome Rodrigo et al. |
| 11,224,009 | B2 | 1/2022 | Krishan |
| 2004/0062278 | A1 | 4/2004 | Hadzic et al. |
| 2004/0208183 | A1 | 10/2004 | Balachandran et al. |
| 2005/0193096 | A1 | 9/2005 | Yu et al. |
| 2006/0010224 | A1 | 1/2006 | Sekar et al. |
| 2007/0242738 | A1 | 10/2007 | Park et al. |
| 2008/0165761 | A1 | 7/2008 | Goppner et al. |
| 2009/0006652 | A1 | 1/2009 | Kasatani |
| 2009/0024727 | A1 | 1/2009 | Jeon et al. |
| 2009/0055835 | A1 | 2/2009 | Zhu |
| 2009/0141625 | A1 | 6/2009 | Ghai et al. |
| 2009/0222584 | A1 | 9/2009 | Josefsberg et al. |
| 2011/0078674 | A1 | 3/2011 | Ershov |
| 2011/0202604 | A1 | 8/2011 | Craig et al. |
| 2013/0029708 | A1 | 1/2013 | Fox et al. |
| 2013/0198269 | A1 | 8/2013 | Fleischman et al. |
| 2013/0272123 | A1 | 10/2013 | Lee et al. |
| 2014/0075004 | A1 | 3/2014 | Van Dusen et al. |
| 2014/0379901 | A1 | 12/2014 | Tseitlin et al. |
| 2015/0039560 | A1 | 2/2015 | Barker et al. |
| 2015/0071074 | A1 | 3/2015 | Zaidi et al. |
| 2016/0156513 | A1 | 6/2016 | Zhang et al. |
| 2016/0350683 | A1 | 12/2016 | Bester et al. |
| 2016/0352588 | A1 | 12/2016 | Subbarayan et al. |
| 2017/0221015 | A1 | 8/2017 | June et al. |
| 2018/0039494 | A1 | 2/2018 | Lander et al. |
| 2018/0083882 | A1 | 3/2018 | Krishan et al. |
| 2018/0213391 | A1 | 7/2018 | Inoue |
| 2018/0262592 | A1 | 9/2018 | Zandi et al. |
| 2018/0262625 | A1 | 9/2018 | McCarley et al. |
| 2018/0285794 | A1 | 10/2018 | Gray-Donald et al. |
| 2018/0324247 | A1 | 11/2018 | Hood et al. |
| 2018/0324646 | A1 | 11/2018 | Lee et al. |
| 2018/0343567 | A1 | 11/2018 | Ashrafi |
| 2019/0007366 | A1 | 1/2019 | Voegele et al. |
| 2019/0045351 | A1 | 2/2019 | Zee et al. |
| 2019/0075552 | A1 | 3/2019 | Yu et al. |
| 2019/0116486 | A1 | 4/2019 | Kim et al. |
| 2019/0116521 | A1 | 4/2019 | Qiao et al. |
| 2019/0140895 | A1 | 5/2019 | Ennis, Jr. et al. |
| 2019/0158364 | A1 | 5/2019 | Zhang et al. |
| 2019/0173740 | A1 | 6/2019 | Zhang et al. |
| 2019/0174561 | A1 | 6/2019 | Sivavakeesar |
| 2019/0182875 | A1 | 6/2019 | Talebi Fard et al. |
| 2019/0191348 | A1 | 6/2019 | Futaki et al. |
| 2019/0191467 | A1 | 6/2019 | Dao et al. |
| 2019/0222633 | A1 | 7/2019 | Howes et al. |
| 2019/0223093 | A1 | 7/2019 | Watfa et al. |
| 2019/0261244 | A1 | 8/2019 | Jung et al. |
| 2019/0306907 | A1 | 10/2019 | Andreoli-Fang et al. |
| 2019/0313236 | A1 | 10/2019 | Lee et al. |
| 2019/0313437 | A1 | 10/2019 | Jung et al. |
| 2019/0313469 | A1 | 10/2019 | Karampatsis et al. |
| 2019/0335002 | A1 | 10/2019 | Bogineni et al. |
| 2019/0335534 | A1 | 10/2019 | Atarius et al. |
| 2019/0342229 | A1 | 11/2019 | Khinvasara et al. |
| 2019/0342921 | A1 | 11/2019 | Loehr et al. |
| 2019/0349901 | A1 | 11/2019 | Basu Mallick et al. |
| 2019/0357092 | A1 | 11/2019 | Jung et al. |
| 2019/0357216 | A1 | 11/2019 | Jung et al. |
| 2019/0380031 | A1 | 12/2019 | Suthar et al. |
| 2019/0394284 | A1 | 12/2019 | Baghel et al. |
| 2019/0394624 | A1 | 12/2019 | Karampatsis et al. |
| 2019/0394833 | A1 | 12/2019 | Talebi Fard et al. |
| 2020/0008069 | A1 | 1/2020 | Zhu et al. |
| 2020/0028920 | A1 | 1/2020 | Livanos et al. |
| 2020/0045753 | A1 | 2/2020 | Dao et al. |
| 2020/0045767 | A1 | 2/2020 | Velev et al. |
| 2020/0053670 | A1 | 2/2020 | Jung et al. |
| 2020/0053724 | A1 | 2/2020 | Molavianjazi et al. |
| 2020/0053828 | A1 | 2/2020 | Bharatia et al. |
| 2020/0059420 | A1 | 2/2020 | Abraham |
| 2020/0059856 | A1 | 2/2020 | Cui et al. |
| 2020/0084663 | A1 | 3/2020 | Park et al. |
| 2020/0092423 | A1 | 3/2020 | Qiao et al. |
| 2020/0092424 | A1 | 3/2020 | Qiao et al. |
| 2020/0127916 | A1 | 4/2020 | Krishan |
| 2020/0136911 | A1 | 4/2020 | Assali et al. |
| 2020/0137174 | A1 * | 4/2020 | Stammers ............. H04L 67/141 |
| 2020/0313996 | A1 | 10/2020 | Krishan et al. |
| 2020/0404608 | A1 * | 12/2020 | Albasheir ............. H04W 60/00 |
| 2020/0412597 | A1 | 12/2020 | Goel et al. |
| 2021/0000723 | A1 | 1/2021 | Strand et al. |
| 2021/0007023 | A1 | 1/2021 | Umapathy et al. |
| 2021/0044481 | A1 * | 2/2021 | Xu ........................ H04L 41/082 |
| 2021/0204200 | A1 | 7/2021 | Krishan et al. |
| 2022/0038999 | A1 | 2/2022 | Sapra et al. |

FOREIGN PATENT DOCUMENTS

| | | |
|---|---|---|
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/138074 A1 | 7/2021 |
| WO | WO 2022/025988 A1 | 2/2022 |

OTHER PUBLICATIONS

Commonly-assigned, U.S. Appl. No. 17/074,553 for "Methods, Systems, and Computer Readable Media for Actively Discovering and Tracking Addresses Associated with 4G Service Endpoints," (Unpublished, filed Oct. 19, 2020).

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and Systems Aspects; Architecture enhancements to facilitate communications with packet data networks and applications (Release 16), 3GPP TS 23.682, V16.8.0, pp. 1-135 (Sep. 2020).

Non-Final Office Action for U.S. Appl. No. 16/697,021 (dated Sep. 29, 2020).

Notice of Allowance and Fee(s) Due for U.S. Appl. No. 16/527,988 (dated Sep. 17, 2020).

Final Office Action for U.S. Appl. No. 16/356,446 (dated Sep. 8, 2020).

Commonly-assigned, co-pending U.S. Appl. No. 17/009,725 for "Methods, Systems, and Computer Readable Media for Service

(56) References Cited

OTHER PUBLICATIONS

Communications Proxy (SCP)-Specific Prioritized Network Function (NF) Discovery and Routing," (Unpublished, filed Sep. 1, 2020).
Commonly-assigned, co-pending U.S. Appl. No. 16/945,794 for "Methods, Systems, and Computer Readable Media for Preferred Network Function (NF) Location Routing Using Service Communications Proxy (SCP)," (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
Ex Parte Quayle Action for U.S. Appl. No. 16/527,988 (filed Jun. 1, 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
Non-Final Office Action for U.S. Appl. No. 16/176,920 (dated Mar. 6, 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Notification of Transmittal of the International Search Report and the Written Opinion of the International Searching Authority, or the Declaration for International Application No. PCT/US2019/053912 (dated Dec. 18, 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
Commonly-assigned, U.S. Appl. No. 16/527,988 for "Methods, Systems, and Computer Readable Media for Network Function (NF) Topology Synchronization," (Unpublished, filed Jul. 31, 2019).
"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).
Commonly-assigned, U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Commonly-assigned, U.S. Appl. No. 16/356,446 for "Methods, Systems, and Computer Readable Media for Locality-Based Selection and Routing of Traffic to Producer Network Functions (NFs)," (Unpublished, filed Mar. 18, 2019).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
Commonly-assigned, U.S. Appl. No. 16/176,920 for "Methods, Systems, and Computer Readable Media for Providing a Service Proxy Function in a Telecommunications Network Core Using a Service-Based Architecture,"(Unpublished, filed Oct. 31, 2018).
"5G; 5G System; Network function repository services; Stage 3 (3GPP TS 29.510 version 15.1.0 Release 15)," ETSI TS 129 510, V15.1.0, pp. 1-87 (Oct. 2018).
"5G; 5G System; Unified Data Repository Services; Stage 3 (3GPP TS 29.504 version 15.1.0 Release 15)," ETSI TS 129 504, V15.1.0, pp. 1-26 (Oct. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Li et al., "Mobile Edge Computing Platform Deployment in 4G LTE Networks: A Middlebox Approach," http://www.usenix.org/system/files/conference/hotedge18-papers-li.pdf, 6 pages (2018).
Mayer, "RESTful APIs for the 5G Service Based Architecture," Journal of ICT, vol. 6_1&2, pp. 101-116 (2018).
"5G Service Based Architecture (SBA)," 5G, pp. 1-61 (downloaded Dec. 24, 2018).
Scholl et al., "An API First Approach to Microservices Development," Oracle, http://blogs.oracle.com/developers/an-api-first-approach-to-microservices-development, pp. 1-12 (Nov. 8, 2017).
"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).
"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Preston-Werner, "Semantic Versioning 2.0.0", Oracle, pp. 1-5 (Jun. 2013).
"LTE and Beyond," https://ytd2525.wordpress.com/2013/03/06/lte-and-beyond/, 3 pages (2013).
Nichols et al., "Definition of the Differentiated Services Field (DS Field) in the IPv4 and IPv6 Headers," Internet Engineering Task Force (IEFT) Netwok Working Group Request for Comments (RFC) 2474, The Internet Society, pp. 1-20 (Dec. 1998).
Commonly-assigned, U.S. Appl. No. 16/942,713 for "Methods, Systems, and Computer Readable Media for Providing Network Function Discovery Service Enhancements," (Unpublished, filed Jul. 29, 2020).
International Search Report and Written Opinion for Patent Cooperation Treaty Application Serial No. PCT/US2020/061885 (dated Feb. 4, 2021).
International Search Report and Written Opinion for Patent Cooperation Treaty Application Serial No. PCT/US2020/057712 (dated Feb. 2, 2021).
Abley, J. et al., "A Mechanism for Remote-Triggered DNS Cache Flushes (DNS Flush) draft-jabley-dnsop-dns-flush-00", Internet Engineering Task Force (IETF), pp. 1-12 (Jun. 24, 2013).
Cheshire, S. et al., "Apple's DNS Long-Lived Queries protocol draft-sekar-dns-llq-06," Internet Engineering Task Force (IETF), pp. 1-26 (Aug. 23, 2019).

(56) References Cited

OTHER PUBLICATIONS

"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Advisory Action for U.S. Appl. No. 16/356,446 (dated Dec. 22, 2020).

Notice of Allowance and Fee(s) Due for U.S. Appl. No. 16/555,817 (dated Dec. 3, 2020).

Notification of Transmittal of the International Search Report and the Written Opinion of the International Searching Authority, or the Declaration for International Application Serial No. PCT/US2020/065765 (dated Apr. 15, 2021).

Ex Parte Quayle Action for U.S. Appl. No. 16/730,799 (dated Apr. 7, 2021).

Commonly-assigned, U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).

"5G; System architecture for the 5G System (5GS) (3GPP TS 23.501 version 15.6.0 Release 15)," ETSI TS 123 501, V15.6.0, pp. 1-168 (Oct. 2019).

"5G; 5G System; Network function repository services; Stage 3 (3GPP TS 29.510 version 15.5.1 Release 15)," ETSI TS 129 510, V15.5.1, pp. 1-132 (Oct. 2019).

"5G; 5G System; Technical Realization of Service Based Architecture; Stage 3 (3GPP TS 29.500 version 15.5.0 Release 15)," ETSI TS 129.500, V15.5.0, pp. 1-40 (Sep. 2019).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-192 (Jul. 2020).

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

"3rd Generation Partnership Project; Technical Specification Group Services and System Aspects; Procedures for the 5G System (5GS); Stage 2," 3GPP TS 23.502 V16.4.0 pp. 1-582 (Mar. 2020).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

Notice of Allowance and Fee(s) Due for U.S. Appl. No. 16/356,446 (dated Sep. 30, 2021).

Ex Parte Quayle Action for U.S. Appl. No. 16/942,713 (Sep. 13, 2021).

Commonly-Assigned, co-pending U.S. Appl. No. 17/193,337 for "Methods, Systems, and Computer Readable Media for Selecting Multiple Network Function Types Using a Single Discovery Request," (Unpublished, filed Mar. 5, 2021).

Notice of Allowance and Fee(s) Due for U.S. Appl. No. 16/730,799 (dated Aug. 16, 2021).

Communication of European publication No. and information on the application of Article 67(3) EPC for European Patent Application Serial No. 19791391.6 (dated Aug. 11, 2021).

Notice of Allowance and Fee(s) Due for U.S. Appl. No. 16/730,799 (dated Jul. 30, 2021).

Notification of Transmittal of the International Search Report and the Written Opinion of the International Searching Authority, or the Declaration for International Application No. PCT/US2021/024000 (dated Jun. 24, 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)," (Unpublished, filed Aug. 3, 2021).

Non-Final Office Action for U.S. Appl. No. 17/082,871 (dated Feb. 7, 2022).

Notice of Publication for European Patent Application Serial No. 20705568.2 (dated Dec. 8, 2021).

Notice of Publication for European Patent Application Serial No. 20705567.4 (dated Dec. 1, 2021).

Commonly-Assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)" (Unpublished, filed Oct. 21, 2021).

"Implementing Quality of Service Policies with DSCP," Cisco, pp. 1-7 (Feb. 15, 2008).

Notice of Allowance for U.S. Appl. No. 16/942,713 (dated Nov. 29, 2021).

\* cited by examiner

METHODS, SYSTEMS, AND COMPUTER READABLE MEDIA FOR OPTIMIZED NETWORK FUNCTION (NF) DISCOVERY AND ROUTING USING SERVICE COMMUNICATIONS PROXY (SCP) AND NF REPOSITORY FUNCTION (NRF)

TECHNICAL FIELD

The subject matter described herein relates to routing messages to producer NFs in 5G communications networks. More particularly, the subject matter described herein relates to methods, systems, and computer readable media for optimized NF discovery and routing using an SCP and an NRF.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all API messages.

The service gateway is a node that sits in front of a group of producer NFs that provide a given service. The service gateway may load balance incoming service requests among the producer NF instances that provide the service in a manner similar to the SCP.

The service mesh is a name for a group of intermediate proxy nodes that enable communications between producer and consumer NFs. The service mesh may include one or more SCPs, SEPPs, and service gateways.

One problem that occurs in 5G networks is that an NRF may indicate that a producer NF instance is available to provide a service; however, the producer NF instance may not be reachable from the consumer NF. For example, one of the most crucial jobs for the NRF is to receive service discovery requests from consumer NFs and return matching responses including service profiles of producer NF instances available to provide a service to a consumer NF. The NRF obtains this information through registration messages from the producer NFs. Even though the network between the producer NFs and the NRF may not be congested, there may be network impairment between the consumer NF and the producer NFs. Thus, when a consumer NF requests from the NRF a list of service profiles producer NF instances capable of providing a service, the NRF may return a list of service profiles of producer NF instances, some of which may not be reachable from the consumer NF. As a result, when the consumer NF sends a service request message to a producer NF instance through the SCP, the SCP may determine that the service endpoint of the selected producer NF instance is not available and perform a reselection process to select a different NF instance of same or different producer NF. Performing the reselection process at the SCP is undesirable, as it increases latency in providing the service to the consumer NF.

In light of these difficulties, there exists a need for methods, systems, and computer readable media for optimized NF discovery and routing using an NRF and an SCP.

SUMMARY

A method for optimized network function (NF) discovery and routing using an NF repository function (NRF) and a service communications proxy (SCP) includes, at the SCP, receiving a discovery request message or generating a discovery request message in response to a received service request message with a 3gpp-Sbi-Discovery header, as defined in Section 5.2.3.2.7 of Third Generation Partnership Project (3GPP) Technical Specification (TS) 29.500. According to Section 5.2.3.2.7 of 3GPP TS 29.500, the 3gpp-Sbi-Discovery header is used to convey NF service discovery factors to the SCP in indirect communication models. The 3gpp-Sbi-Discovery header contains discovery parameters to be conveyed by the NF consumer to the SCP and is used for finding a suitable NF producer instance, e.g. by performing the NF service discovery procedure with the NRF on behalf of the NF consumer in case of indirect communication with the delegated discovery model.

The method further includes modifying, by the SCP, the discovery request message to identify as unhealthy at least one endpoint and service name combination associated with a producer network function (NF) instance capable of providing a service identified in the discovery request message or the service request message with the 3gpp-Sbi-Discovery header. The method further includes forwarding, by the SCP, the modified discovery request message to the NRF. The method further includes at the NRF, creating a list of service profiles of producer NF instances capable of providing the service identified in the modified discovery request message. The method further includes excluding, by the NRF and from the list, at least one service profile of at least one producer NF instance corresponding to the at least one endpoint and service name combination identified as unhealthy in the modified discovery request message. The method further includes forwarding, by the NRF and to the SCP, a discovery response message including the list of service profiles of producer NF instances.

According to another aspect of the subject matter described herein, the method for optimized NF discovery and routing includes maintaining, at the SCP, an unhealthy endpoint database and modifying the discovery request message includes performing a lookup in the unhealthy endpoint database using service name included in or derived from the discovery request message or the service request message with the 3gpp-Sbi-Discovery header, locating a record in the unhealthy endpoint database corresponding to the service name included in or derived from the discovery or service request message, extracting the endpoint from the record, and inserting the endpoint and the service name into the discovery request message.

According to another aspect of the subject matter described herein, inserting the endpoint and service name into the discovery request message includes inserting the endpoint and the service name into a custom header of the discovery request message.

According to another aspect of the subject matter described herein, maintaining the unhealthy endpoint database includes, in response to a determination that a producer NF instances associated with an endpoint and service name combination is unhealthy: determining whether a record corresponding to the endpoint and service name combination exists in the unhealthy endpoint database; in response to determining that a record corresponding to the endpoint and service name combination does not exist in the unhealthy endpoint database, adding a record corresponding to the endpoint and service name combination to the unhealthy endpoint database; inserting a timestamp in the record; and starting a cleanup timer for the record.

According to another aspect of the subject matter described herein, the method for optimized NF discovery and routing includes detecting expiration of the cleanup timer, and, in response, deleting the record corresponding to the endpoint and service name combination from the unhealthy endpoint database.

According to another aspect of the subject matter described herein, creating the list of service profiles of producer NF instances includes extracting a service name parameter from the modified discovery request message, identifying service profiles of producer NF instances capable of providing the service identified by the service name parameter, and including the service profiles of the producer NF instances capable of providing the service identified by the service name parameter in the list.

According to another aspect of the subject matter described herein, excluding the at least one service profile from the list includes removing, from the list, at least one service profile corresponding to the at least one endpoint and service name combination identified as unhealthy in the modified discovery request message received from the SCP.

According to another aspect of the subject matter described herein, the at least one service profile excluded from the list includes at least one service profile of at least one producer NF instance having connectivity with the NRF and being unreachable from the SCP.

According to another aspect of the subject matter described herein, receiving a discovery or service request message includes receiving a service request message indicating delegated discovery and further comprising, at the SCP, after receiving the discovery response message, forwarding the service request message to one of the producer NF instances having a service profile in the list.

According to another aspect of the subject matter described herein, a system for optimized NF discovery and routing comprises a service communications proxy (SCP) including at least one processor. The system includes an NF repository function (NRF) including at least one processor. The system further includes an SCP discovery/service request handler and database manager implemented by the at least one processor of the SCP for receiving a discovery request message or generating a discovery request message in response to a received service request message, modifying, the discovery request message to identify as unhealthy at least one endpoint and service name combination associated with at least one producer NF instance capable of providing a service identified in the discovery or service request message, and forwarding, by the SCP, the modified discovery request message to the NRF. The system further includes an NRF discovery request handler implemented by the at least one processor of the NRF for creating a list of service profiles of producer NF instances capable of providing the service identified in the modified discovery request message, excluding, from the list, at least one service profile of at least one producer NF instance corresponding to the at least one endpoint and service name combination identified as unhealthy in the modified discovery request message, and forwarding, to the SCP, a discovery response message including the list of service profiles of producer NF instances.

According to another aspect of the subject matter described herein, the system for optimized NF discovery and routing includes an unhealthy endpoint database located at the SCP and the SCP discovery/service request handler and database manager is configured to modify the discovery request message by: performing a lookup in the unhealthy endpoint database using service name included in or derived from the discovery or service request message; locating a record in the unhealthy endpoint database corresponding to the service name identified in or derived from the discovery request message or the service request message with the 3gpp-Sbi-Discovery header; extracting the endpoint from the record; and inserting the endpoint and the service name into the discovery request message.

According to another aspect of the subject matter described herein, the SCP discovery/service request handler and database manager is configured to insert the endpoint and the service name into a custom header of the discovery request message.

According to another aspect of the subject matter described herein, the SCP discovery request handler is configured to follow model D in Section E1 of 3GPP TS 23.501 and generate a discovery request message using discovery parameters received in a service request with the 3gpp-Sbi-Discovery header from a consumer NF in delegated discovery mode and by: performing a lookup in the unhealthy endpoint database using service identifier included in or derived from the discovery parameters in the service request; locating a record in the unhealthy endpoint database corresponding to the service identified in or derived from the service request message; extracting an identifier for the endpoint from the record; and inserting identifier for the endpoint in the discovery request message.

According to another aspect of the subject matter described herein, the SCP discovery/service request handler and database manager is configured to, in response to a determination that a producer NF instance associated with an endpoint and service name combination is unhealthy: determine whether a record corresponding to the endpoint and service name combination exists in the unhealthy endpoint database; in response to determining that a record corresponding to the endpoint and service name combination does not exist in the unhealthy endpoint database, add a record corresponding to the endpoint and service name combination to the unhealthy endpoint database; insert a timestamp in the record; and start a cleanup timer for the record.

According to another aspect of the subject matter described herein, the SCP discovery/service request handler and database manager is configured to detect expiration of the cleanup timer, and, in response, delete the record corresponding to the endpoint and service name combination from the unhealthy endpoint database.

According to another aspect of the subject matter described herein, the NRF discovery request handler is configured to extract a service name parameter from the modified discovery request message, identify service profiles of service endpoints on producer NFs capable of providing the service identified by the service name parameter, and include the service profiles of the service endpoints on producer NFs capable of providing the service identified by the service name parameter in the list.

According to another aspect of the subject matter described herein, the service profiles excluded from the list include service or NF profiles of service endpoints on producer NFs having connectivity with the NRF but that are unreachable from the SCP.

According to another aspect of the subject matter described herein, the SCP discovery/service request handler and database manager is configured to receive the discovery response message, forward the discovery response message to a consumer NF, receive, from the consumer NF, a service request message addressed to one of the service endpoints in the list and forward the service request to the service endpoint.

According to another aspect of the subject matter described herein, a non-transitory computer readable medium having stored thereon executable instructions that when executed by a processor of a computer control the computer to perform steps is provided. The steps include, at a service communications proxy (SCP), receiving a discovery request message or generating a discovery request message in response to a received service request message with a 3gpp-Sbi-Discovery header. The steps further include modifying, by the SCP, the discovery request message to identify as unhealthy at least one endpoint service name combination corresponding to at least one producer NF instance capable of providing a service identified in the discovery or service request message. The steps further include forwarding, by the SCP, the modified discovery request message to an NF repository function (NRF). The steps further include, at the NRF, creating a list of service profiles of service endpoints on producer NFs capable of providing the service identified in the modified discovery request message. The steps further include excluding, by the NRF and from the list, at least one service profile of at least one producer NF instance associated with the endpoint and service name combination identified as unhealthy in the modified discovery request message. The steps further include forwarding, by the NRF and to the SCP, a discovery response message including the list of service profiles of producer NF instances.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
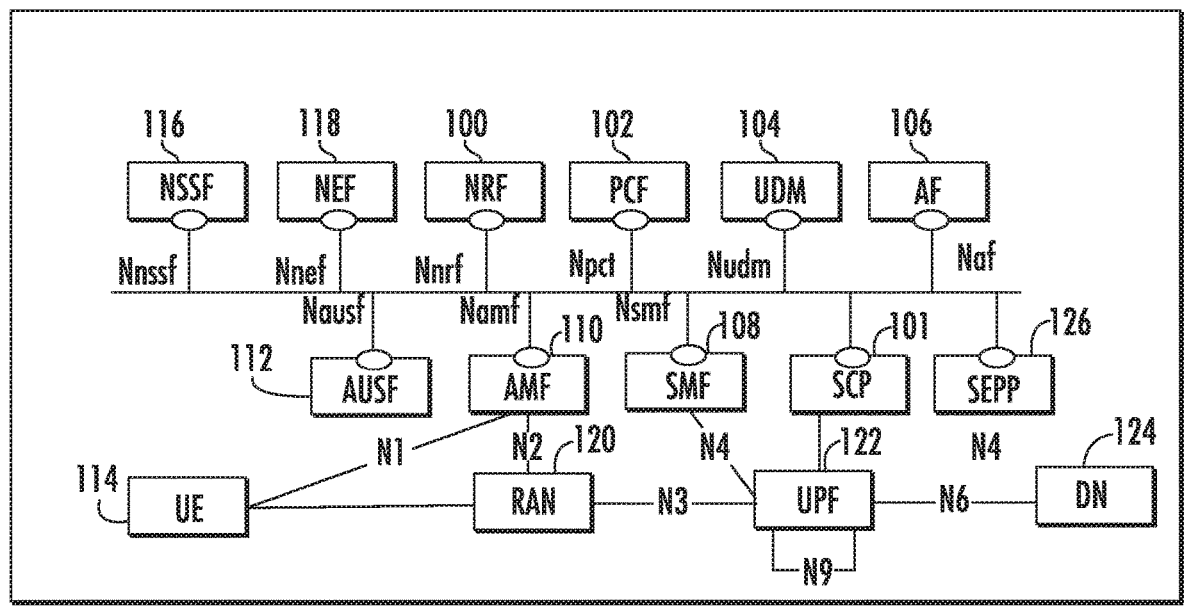
FIG. 1 is a network diagram illustrating an exemplary 5G network architecture.

The subject matter described herein relates to methods, systems, and computer readable media for optimized service discover and routing using an SCP and an NRF. The subject matter may be implemented in a 5G system network architecture or a network architecture that includes both 5G and non-5G network elements. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

Figure 2:
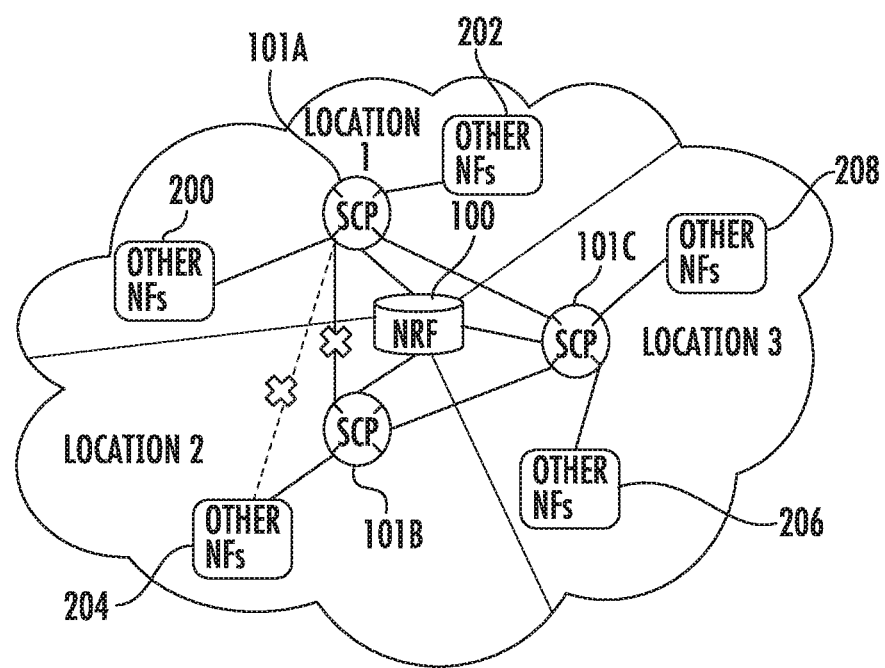
FIG. 2 is a network diagram illustrating a problem that occurs when a producer NF has connectivity with an NRF but the connectivity between the producer NF and a consumer NF may be down or unavailable.

As stated above, one problem that occurs in 5G networks is that an NRF will report when a discovery response message that a producer NF instance is available to provide a service when the network between the NRF and the producer NF instance is uncongested. However, a consumer NF may not be able to reach the producer NF instance because the network between the consumer NF and the producer NF instance is congested or unavailable. FIG. 2 illustrates this problem in more detail. In FIG. 2, an SCP 101A serves location 1, an SCP 101B serves location 2, and an SCP 101C serves location 3. The NRF 100 responds to the discovery requests in each of locations 1, 2, and 3. In this example, consumer NFs 200 and 202 reside in location 1. Producer NFs 204 reside in location 2, and producer NFs 206 and 208 reside in location 3. In the illustrated example, producer NFs 204 in location 2 register with NRF 100, and NRF 100 marks producer NFs 204 as registered (which indicates that producer NFs 204 are available). This is possible because producer NFs 204 have good connectivity with NRF 100.

However, consumer NFs 200 and 202 residing in location 1 may lack good connectivity with location 2, indicated by the X marks on the lines between SCP 101A and producer NFs 204 and between SCP 101A and SCP 1018. Accordingly, when a consumer NF 200 or 202 sends a discovery request to NRF 100 requesting service provided by producer NFs 204, NRF 100 will return a list including service profiles of producer NF instances on producer NFs 204 to the requesting consumer NFs 200 or 202. Consumer NF 200 or 202, upon receiving a response to the discovery request, will send service requests to their local SCP 101A. SCP 101A may determine that producer NF instances on producer NFs 204 are unreachable and may perform a reselection process to select an alternate producer NF instance to handle the service request. For example, SCP 101A may select an alternate producer NF instance in location 2 or may select one of the producer NF instances on producer NFs 206 and 208 in location 3. Such reselection is undesirable as it adds latency in processing service requests. There is currently no mechanism in 3GPP to provide feedback to the NRF where producer NF availability can be restricted to a set of consumer NFs. 3GPP allows producers to limit discovery based on domain, network slice selection assistance identifier (NSSAI), NF type, etc. However, this does not solve the problem of restricting the set of producer NF instances based on connectivity or producer NF instance health.

Figure 3:
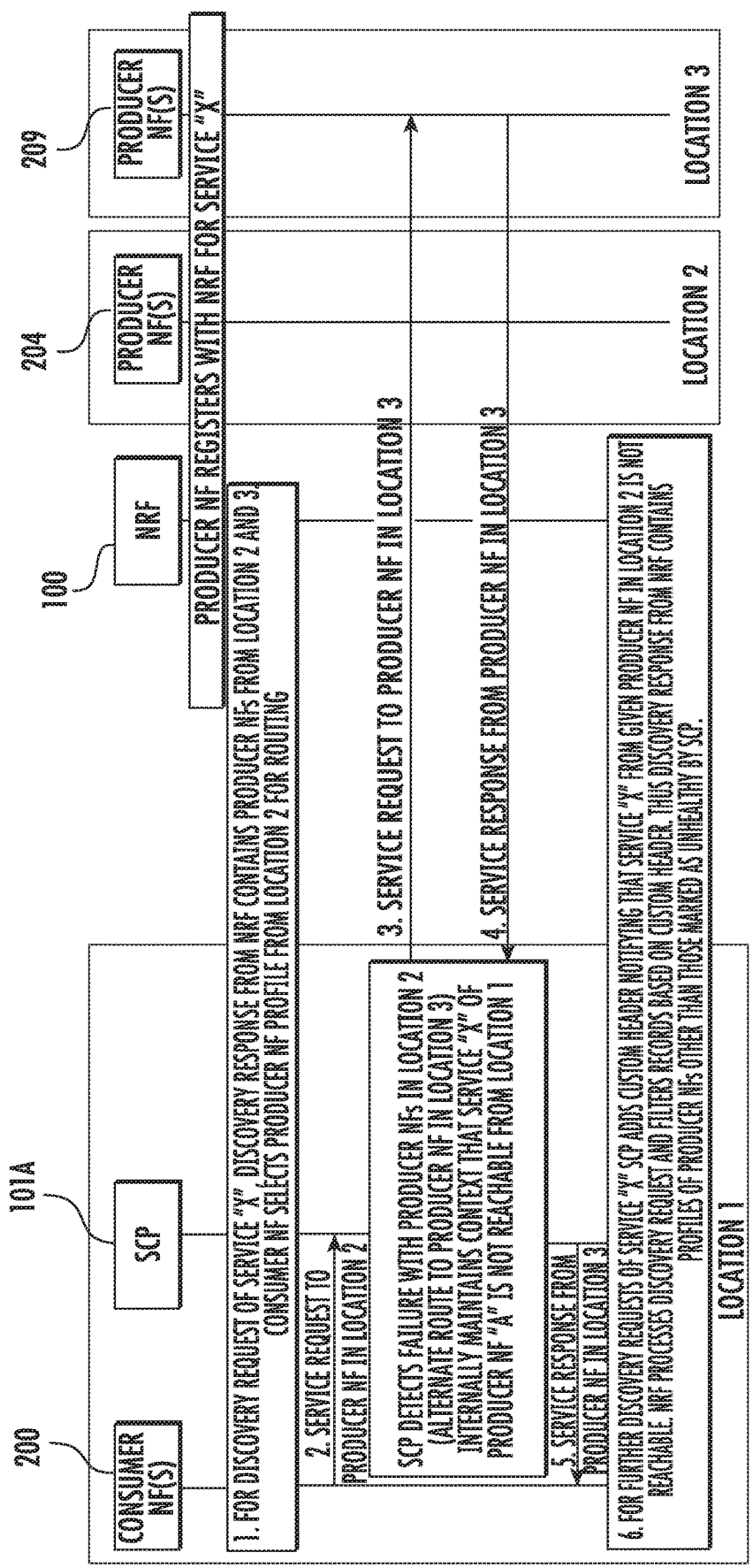
FIG. 3 is a message flow diagram illustrating exemplary messaging between consumer NFs, an SCP, an NRF for optimized routing using an SCP and an NRF.

FIG. 3 is a message flow diagram illustrating exemplary messaging for optimized routing using an SCP and an NRF. Referring to FIG. 3, in line 1, one of consumer NFs 200 sends a discovery request for a service X to NRF 100. NRF 100 responds to the discovery request with a list of service profiles of producer NF instances from location 2 and location 3 capable of providing the service. Consumer NF 200 selects a service endpoint from a producer NF in location 2 for providing the service.

In line 2 of the message flow diagram, the consumer NF that sent the discovery request sends a service request to SCP 101A requesting service from a producer NF in location 2. SCP 101A determines the selected service endpoint of producer NF in location 2 is unavailable, for example, due to lack of connectivity, and determines that there is a producer NF instance in location 3 that is capable of providing the service. Accordingly, in line 3 of the message flow diagram, SCP 101A forwards the service request to one of the producer NF instances on producer NFs 208 in location 3 that is capable of providing the service.

SCP 101A maintains internally a service context that a service X of producer NF 204 is not reachable from location 1. As will be described in more detail below, SCP 101A may maintain an unhealthy endpoint database that includes a list of service endpoints that are not reachable from the location of SCP 101A.

In line 4 of the message flow diagram, the producer NF instance on producer NF 208 in location 3 that received the service request message responds to the service request. For example, if producer NF 208 is a PCF and the service request is a request for policy service, the producer NF instance on producer NF 208 may respond to the service request by providing policy instructions to requesting consumer NF 200.

In line 5 of the message flow diagram, SCP 101A receives the service response and forwards the response to the requesting consumer NF 200.

Because SCP 101A maintains context about the health or reachability of producer NF instances on producer NFs 204, SCP 101A can utilize this context to facilitate optimized routing by communicating the context to NRF 100. Such utilization is illustrated by line 6 of the message flow diagram where, when SCP 101A receives further discovery requests for service X, SCP 101A adds a custom header notifying or indicating to NRF 100 that service X from a given producer NF in location 2 is not reachable from the location of SCP 101A. SCP 101A forwards this discovery request to NRF 100. NRF 100 processes the discovery request and filters the service profiles in the list of service profiles that is returned in response to the discovery request based on the custom header. The discovery response from NRF 100 will contain the profiles of producer NF instances on producer NFs that are reachable from location 1. In the example illustrated in FIG. 3, the discovery response would include service profiles of producer NF instances on producer NFs from location 3, but not service profiles of producer NF instances of producer NFs from location 2. Utilizing such a system, the consumer NFs can send a service request to producer NF instances on producer NFs that are reachable by the consumer NFs and the SCP was not required to provide a re-selection service, which could result in processing delay of the service request.

One issue that should be considered is whether the NRF should blacklist all producer NFs in a given location when the SCP notifies the NRF that a service endpoint in that location is not reachable. In one exemplary implementation, the NRF will not blacklist all service endpoints when it receives an indication that one endpoint in a given location is unavailable. The problem being faced by an SCP instance may be for a specific service instance only. Thus, limiting traffic to all producer NFs from that location is not an ideal choice. When the SCP detects that a given endpoint is down, the NRF may exclude the service profile of producer NF instances associated with that endpoint from discovery response messages to the SCP in the region from which the endpoint is unreachable, but not from other regions.

In some implementations, more than one service may share a given endpoint (i.e., when NF services have common application programming interface (API) gateway as their exposure point). Should the NRF restrict discovery of all service instances that share a given endpoint when the SCP determines that one service that shares or exposes a given endpoint is down? In an ideal implementation, the answer is no, because some of the other services that share or expose the same endpoint may be available (assuming the problem is with the one service and not the network between the endpoint and the consumer NFs. When the SCP detects that a given service that shares an endpoint with other services is down, the SCP should notify the NRF about the service instance that is impacted on that endpoint. The NRF avoids discovery of that service instance from consumer NFs having location served by SCP that notified the NRF about service instance unavailability.

Two main components of the subject matter described herein are the SCP and the NRF. Their functions in providing optimized routing as described herein are as follows:

SCP

For given service names (service name is identified from the registered uniform resource indicator (RURI), the SCP maintains list of endpoints that have unhealthy network status. An endpoint can be unhealthy due to reachability or congestion or any other criteria being monitored by SCP. Endpoints can be identified by fully qualified domain name (FQDN), Internet protocol (IP) address, or both.

The SCP starts a cleanup timer for each service endpoint that is marked as unhealthy. On expiry of the cleanup timer, the SCP marks service instance as healthy again by removing the record for the endpoint from the unhealthy endpoint database. For case of network unreachability, "ping" or other network tools can be used to track the endpoint reachability. For a simplified implementation, the subject matter described herein uses timer based options to determine when to mark an endpoint identified as unhealthy as healthy again.

The SCP adds custom headers to a discovery request message where the custom header identifies endpoints that have been marked by the SCP as unhealthy. This is to provide guidance to the NRF on which service profiles should be excluded from the discovery response.

NRF

Based on parameters in a received discovery request message, the NRF generates a list of viable service profiles of producer NF instances capable of providing each service identified in the discovery request message. The NRF removes or excludes from the list the profiles of service instances that match with endpoints indicated as unhealthy by the SCP in the custom header. The NRF returns the service profiles in a discovery response.

SCP Algorithm

Figure 4A:
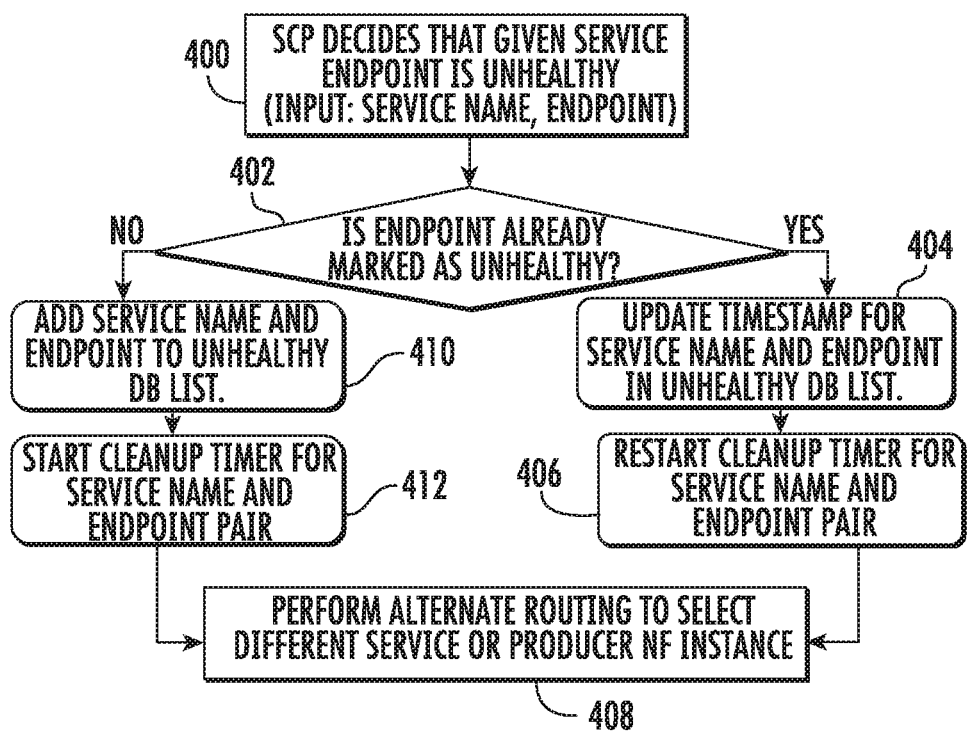
FIG. 4A is a flow chart illustrating an exemplary SCP algorithm for marking service endpoints as unhealthy and utilizing service endpoints health information in making routing decisions.

FIG. 4A illustrates exemplary behavior of an SCP for an endpoint whose network status is determined to be unhealthy. Referring to FIG. 4A, in step 400, SCP 101 determines that a given service endpoint is unhealthy. This determination may be made in any suitable manner, such as failing to receive a response from the endpoint to a service request or an http heartbeat message. The service endpoint may be identified by a service name and an endpoint identifier. In step 402, if the service endpoint is already marked as unhealthy, control proceeds to step 404 where the timestamp for the service name and endpoint is updated in an unhealthy endpoint database maintained by SCP 101. Table 1 shown below illustrates an example of an unhealthy endpoint database that may be maintained by SCP 101.

TABLE 1

Unhealthy Endpoint Database Example
Unhealthy endpoints

| Service Name | Endpoint(s) | Timestamp |
|---|---|---|
| nudm-sdm | sdm1.udm1.com | <in secs> |
| nudm-sdm | sdm2.oracle.com | <in secs> |
| nudm-sdm | 100.10.2.4 | <in secs> |
| nudm-uecm | 100.10.2.5 | <in secs> |

In Table 1, endpoint and service name combinations that have been determined to be unhealthy are identified by service name and endpoint identifier. The service name specifies the 3GPP service provided by the endpoint. In Table 1, the identified services are nudm-sdm, which is used by consumer NFs to retrieve subscription information for a UE, and nudm-uecm service, which is used by consumer NFs to obtain context information regarding transactions being performed by a UE. The endpoints providing the services are identified by fully qualified domain names (FQDNs) or IP addresses. Each entry in Table 1 further includes a timestamp, which is the time that the entry was added to the unhealthy endpoint database. It should also be noted that endpoints, rather than entire services, are marked as unhealthy. Marking endpoints rather than services as unhealthy enables consumer NFs to obtain services from healthy endpoints that provide a service even when other endpoints that provide the same service are unhealthy or not reachable.

It should also be noted that SCP 101 marks an endpoint and service name combination as unhealthy when SCP 101 cannot obtain the identified service from the producer NF instance that exposes the endpoint. An unhealthy status recorded for an endpoint and service name combination in the unhealthy endpoint database could be caused by the producer NF instance being unreachable by the SCP, even if the producer NF instance is capable of registering with the NRF, as is the case with producer NF instances located on producer NFs 204 illustrated in FIG. 2. It should also be noted that because SCPs maintain health status information regarding producer NFs that the SCPs can reach, the unhealthy endpoint database maintained by SCPs in different regions, such as SCPs 101A, 101B, and 101C in FIG. 2 may be different. Because each SCP maintains its own region or location-specific unhealthy endpoint database of service instances on producer NFs that are unreachable from that SCP, and the NRF returns service profiles of producer NF instances that are reachable by that SCP, the efficiency of the network is increased over a solution where unhealthy producer NF instance status is not SCP-specific. Stated differently, the subject matter described herein enables the NRF to formulate and return SCP-region-specific lists of service profiles of producer NF instances that are reachable from each SCP.

Returning to FIG. 4A, after updating the timestamp for the service name and endpoint pair in step 404, control proceeds to step 406, where the SCP restarts the cleanup timer for the service name and endpoint pair. The cleanup timer is a timer maintained by the SCP for each entry in the unhealthy endpoint database. The SCP starts the cleanup timer when an entry is added to the unhealthy endpoint database. When the timer reaches a predetermined value, the SCP removes the entry from the unhealthy endpoint database.

In step 408, the SCP performs alternate routing to select a different service endpoint or producer NF in response to receiving a service request for an endpoint that is marked as unhealthy.

Returning to step 402, if the endpoint is not already marked as unhealthy, control proceeds to step 410 where the service name and endpoint identifier are added to the unhealthy endpoint database. In step 412, the cleanup timer is started for the service name and endpoint identifier pair. Control then proceeds to step 410 where alternate routing is used to route the service request to a producer NF instance on a producer NF that is not listed in the unhealthy endpoint database.

Figure 4B:
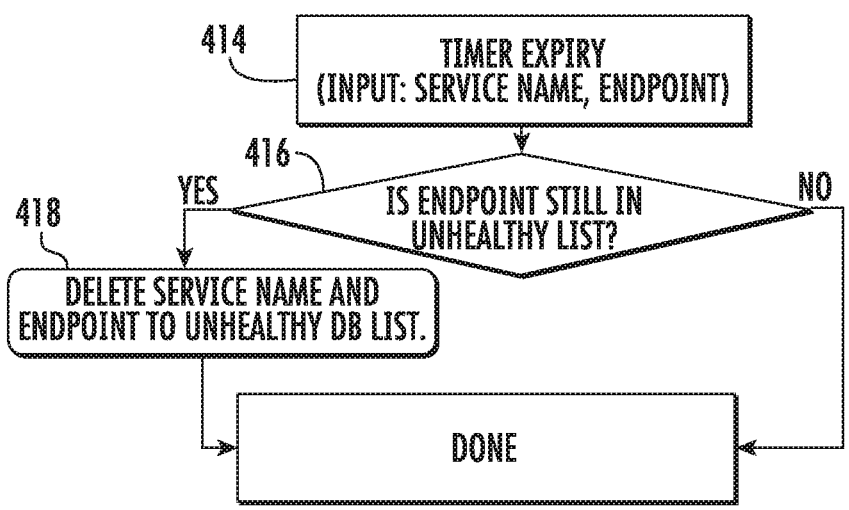
FIG. 4B is a flow chart illustrating an exemplary SCP algorithm for maintaining a list of unhealthy service endpoints.

FIG. 4B illustrates an exemplary process performed by SCP 101 to clean up entries in the unhealthy endpoint database. The purpose of the cleanup process is to mark producer NF instances as healthy by default and only mark them as unhealthy if they are detected as unhealthy and for a short time thereafter. Referring to FIG. 4B, in step 414, the cleanup timer for a service name and endpoint pair expires. In step 416, the SCP determines whether the endpoint and service name combination is still in the unhealthy list or database. If the endpoint and service name combination is still in the unhealthy list or database, control proceeds to 418 where the service name and endpoint are deleted from the unhealthy endpoint database. If the service name and endpoint combination is not still in the unhealthy list or database, the process ends. It should be noted that a single timer or individual timers can be used to manage unhealthy service instances. Using individual timers for each service name and endpoint pair is just an example implementation of the subject matter described herein. The implementation can be changed to a single timer for all endpoint and service name pairs without departing from the scope of the subject matter described herein.

Figure 5:
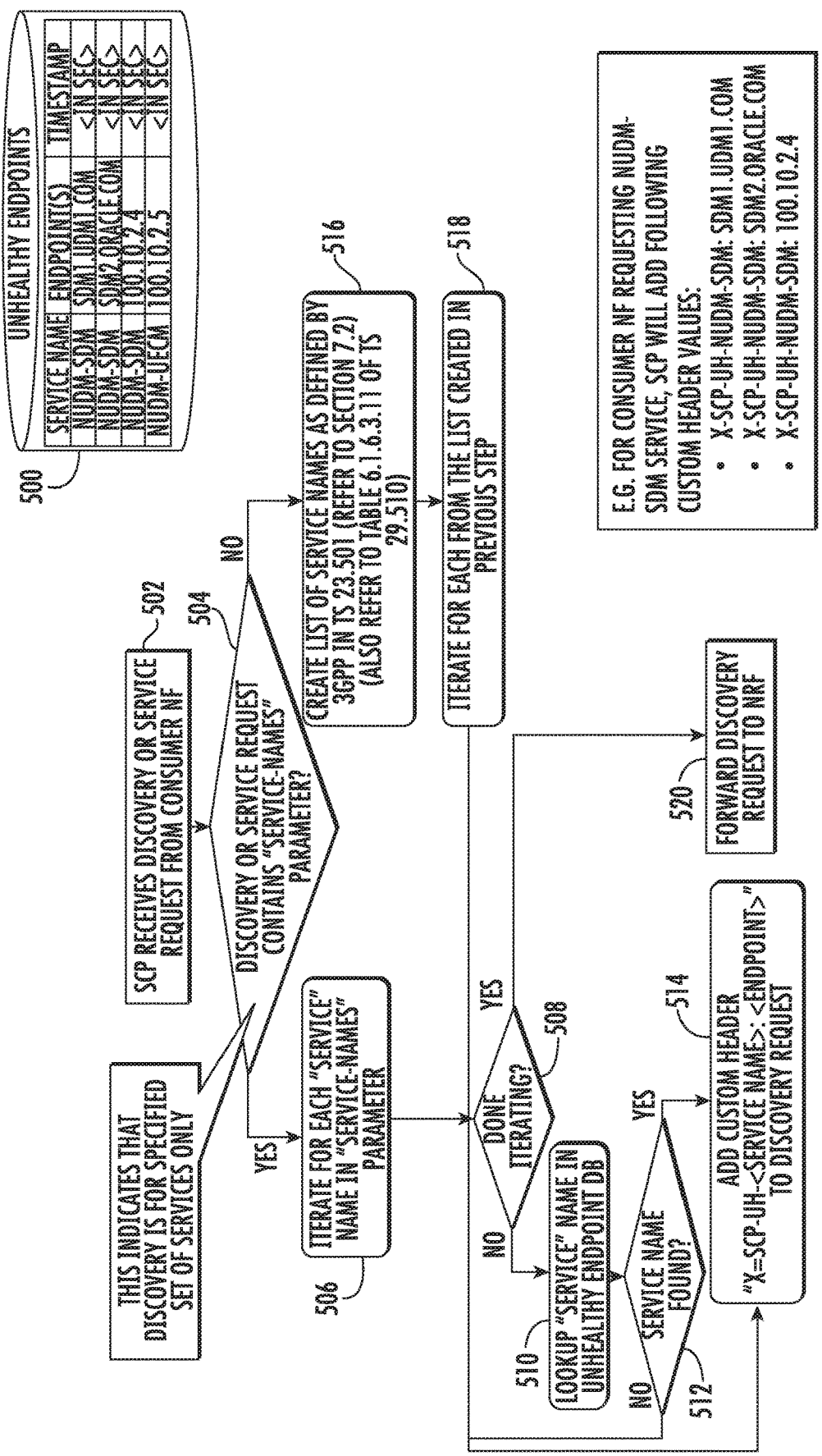
FIG. 5 is a flow chart illustrating an exemplary SCP process for adding a custom header carrying health information to a discovery request.

FIG. 5 is a flow chart illustrating an exemplary process performed by SCP 101 in response to receiving a discovery request or a service request with a 3gpp-Sbi-Discovery header, from a consumer NF. For example, SCP 101 may receive a discovery request form a consumer NF when the consumer NF is performing service discovery. SCP 101 may receive a service request from a consumer NF in the case where the consumer NF implements delegated discovery, and SCP 101 supports delegated discovery, as illustrated by model D in Section E1 of 3GPP TS 23.501. FIG. 5 also illustrates the same unhealthy endpoint database 500 illustrated in Table 1. Referring to FIG. 5, in step 502, SCP 101 receives a discovery request or a service request with a 3gpp-Sbi-Discovery header (indicating delegated discovery) from a consumer NF. In step 504, SCP 101 determines whether the discovery or service request includes a service names parameter. If the discovery parameter includes a service names parameter, control proceeds to step 506 where SCP 101 begins iterating for each service name in the service names parameter. In step 508, SCP 101 determines whether iteration is complete for the service name currently being checked. In step 510, SCP 101 performs a lookup in unhealthy endpoint database 500 for the service name. In step 512, it is determined whether a service name is found. If a service name is found, control proceeds to step 514 where SCP 101 adds unhealthy endpoint information for the endpoint corresponding to the entry in unhealthy endpoint database 500 to the discovery request. In one implementation, SCP 101 may insert the unhealthy endpoint information into a discovery request by adding a custom header to the discovery request. The custom header indicates the service name and endpoint that are marked as unhealthy in unhealthy endpoint database 500. In the example illustrated in FIG. 5, the custom header is of the format "X-SCP-UH-<service name>:<endpoint>", wherein X-SCP-UH is the prefix for the header, <service name> is the name of the service provided by the endpoint marked as unhealthy, and <endpoint> is the identifier of the service endpoint marked as unhealthy.

Returning to step 504, if the service request does not contain a service names parameter, control proceeds to step 516 where SCP 101 creates a list of service names as defined by 3GPP TS 23.501 section 7.2. Creating a list of service names is also described in Table 6.1.6.3.11 of 3GPP TS 29.510. After the list is created, control proceeds to step 518 where SCP 101 iterates through the process of determining whether each service name is located in the unhealthy endpoint database and, if so, adds a custom header identifying the endpoint as unhealthy to the discovery request.

Returning to step 508, once SCP 101 completes iterating through the service names in the service names parameter list or the list of service names generated by SCP 101, control proceeds to step 520 where SCP 101 forwards the discovery request to NRF 100. In the example illustrated in FIG. 5, if a consumer NF is requesting nudm-sdm service,. SCP 101 will add the following custom header values to the discovery request message:

X-SCP-UH-nudm-sdm: sdm1.udm1.com
    X-SCP-UH-nudm-sdm: sdm2.oracle.com
    X-SCP-UH-nudm-sdm: 100.10.2.4

In the example above, each of the custom header values that is added to the discovery request are for the endpoints that provide nudm-sdm service and that are identified as unhealthy in unhealthy endpoint database 500. As will be described in detail below, NRF 100 utilizes the endpoints identified in the custom headers to filter the list of service profiles returned in the discovery response and exclude from the list the service profiles of endpoints that are marked as unhealthy in unhealthy endpoint database 500.

Figure 6:
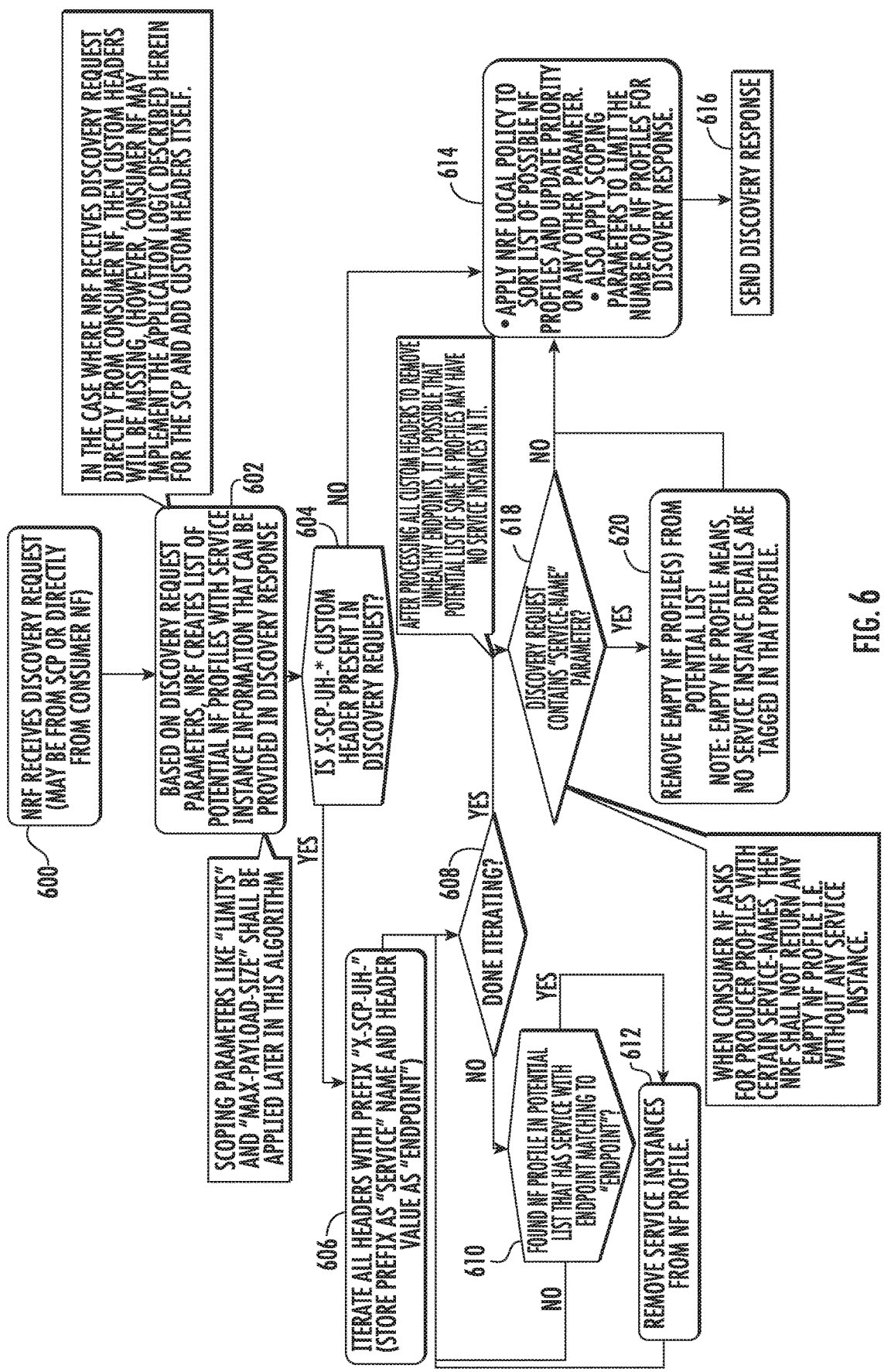
FIG. 6 is a flow chart illustrating an exemplary NRF algorithm for processing discovery requests received from an SOP.

FIG. 6 is a flow chart illustrating an exemplary algorithm performed by NRF 100 in processing a discovery request. Referring to FIG. 6, in step 600, NRF 100 receives the discovery request. The discovery request may be from SCP 101 or directly from a consumer NF. In the case where the NRF receives the discovery request directly from the consumer NF, the custom headers may be missing. However, the consumer NF may implement the application logic described herein for the SCP and add custom headers identifying unhealthy endpoints to the discovery request.

In step 602, NRF 100, based on the discovery request parameters, creates a list of potential service profiles with service instance information that can be provided in a discovery response. A service or NF profile is a data structure defined in 3GPP TS 29.510 and maintained by the NRF for each producer NF instance that has registered with the NRF. The service profile includes parameters, such as the nfInstanceID, which uniquely identifies an NF instance, the NF type, which identifies the type of network function, etc. The consumer NF that receives a list of service profiles will utilize the information in the service profiles to select a producer NF instance to provide a given service and send a service request to the producer NF instance.

In step 604, NRF 100 determines whether the custom headers indicating unhealthy endpoint and service name combinations are present in the discovery request. If the custom headers indicating unhealthy endpoint and service name combinations are present, control proceeds to step 606 where NRF 100 iterates through all headers with the prefix "X-SCP-UH", which indicates that the header includes information identifying an unhealthy endpoint and service name combination. The information included in the custom header may include the service name and endpoint for each combination determined by the SCP that send the discovery request to be unhealthy.

In step 608, if the NRF is not finished iterating through all of the custom headers, control proceeds to step 610 where NRF 100 determines whether there are any service profiles in the service profile list created in step 602 that match the current endpoint being examined in the custom headers. If a matching endpoint is located, control proceeds to step 612 where NRF 100 removes the service instance from the service profile list. Removing the service profile from the list includes the deleting the service profile for the producer NF instance from the list of service profiles that will be provided to the SCP or consumer NF in the discovery response.

Returning to step 604, if there are no custom headers present in the discovery request message, control proceeds to step 614 where NRF 100 applies its local policy to order or sort the list of service profiles, update priority or other parameters, and apply scoping to limit the number of service profiles returned in a discovery response. In step 616, the discovery response is sent to the consumer NF or SCP.

Returning to step 608, if NRF 100 determines that it has iterated through all of the custom headers in the discovery request message, control proceeds to step 618 where NRF 100 determines whether the discovery request includes a service name parameter. If the discovery request does not include a service name parameter, control returns or proceeds to step 614 where NRF 100 applies local NRF policy to sort the list of possible service profiles, applies scoping parameters, etc. and step 616 where NRF 100 sends the discovery response to the requester.

Returning to step 618, if a service name parameter is present in the discovery request message, control proceeds to step 620 where NRF 100 removes empty service profiles from the potential list of profiles that will be returned to the requester. Control then proceeds to step 614 and 616 where the list of profiles is sorted and the discovery response is sent to the requester.

In step 608, once NRF 100 has completed iterating through the list of service profiles, control proceeds to steps 614, 616, 618, and 620 where NRF 100 sorts the list of service profiles of producer NF instances capable of providing a service identified in the discovery request with unhealthy service profiles removed from the list and sends the discovery response to the requesting SCP or consumer NF.

Figure 7:
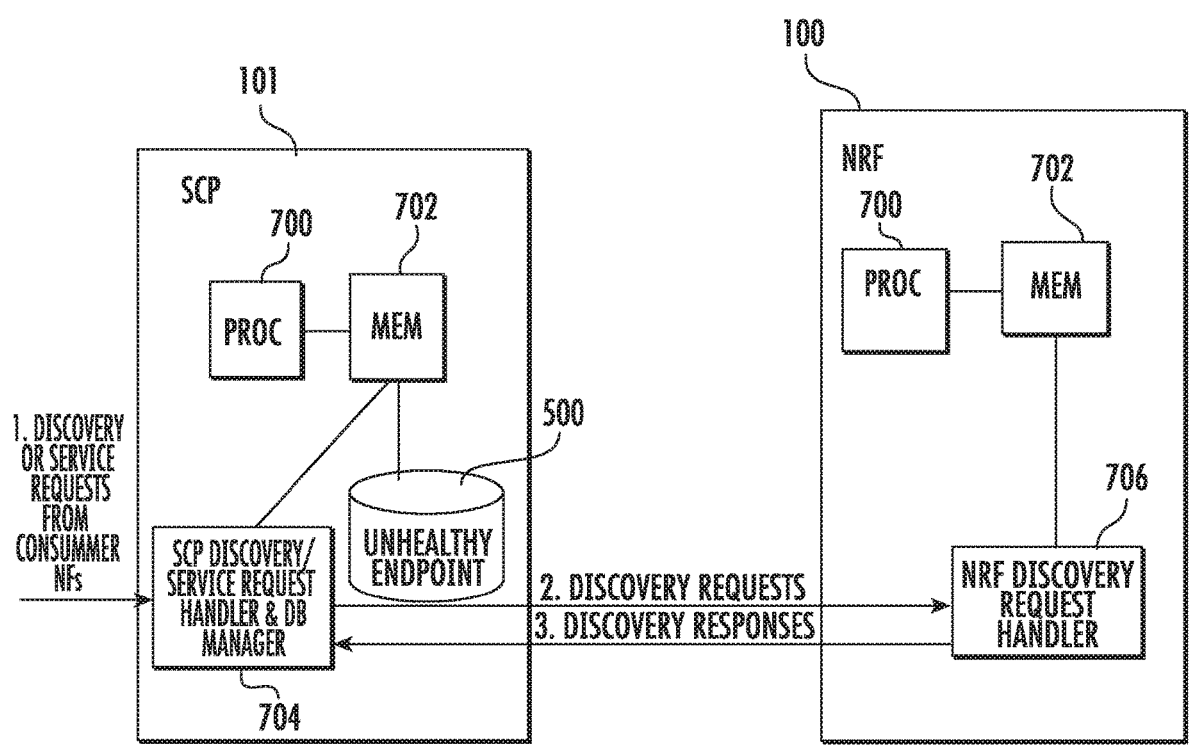
FIG. 7 is a block diagram illustrating an SCP and a NRF including components for optimized routing as subscribed herein.

FIG. 7 is a block diagram illustrating an exemplary SCP and NRF capable of performing the steps described herein for optimized NF discovery and routing. Referring to FIG. 7, SCP 101 and NRF 100 each include at least one processor 700 and a memory 702. SCP 101 further includes unhealthy endpoint database 500 that stores the list of endpoints that have been marked as unhealthy by SCP 101. Unhealthy endpoint database 500 may reside in memory 702 of SCP 101. SCP 101 further includes an SCP discovery/service request handler and database manager 704 that processes discovery requests and service requests with 3gpp-Sbi-Discovery headers from consumer NFs. In the case of discovery request received from consumer NFs, SCP discovery/service request handler and database manager 704 may modify the discovery request to include unhealthy endpoint and service name information. In the case of delegated discovery where SCP 101 formulates a discovery request on behalf of a consumer NF, SCP discovery/service request handler and database manager 704 may receive a service request with a 3gpp-Sbi-Discovery header, formulate a discovery request on behalf of the consumer NF and modify the discovery request to include the unhealthy endpoint and service name information. SCP discovery/service request handler and database manager 704 also maintains the list of unhealthy service name and endpoint combinations in database 500. SCP discovery/service request handler and database manager 704 may be implemented by computer executable instructions stored in memory 702 of SCP 101 and that are executed by processor 700 of SCP 101.

As stated above, SCP 101 maintains a local list of unhealthy endpoint and service name combinations and different SCPs may maintain different lists of unhealthy endpoint and service name combinations. As a result, the problems described above with regard to FIG. 2 where producer NFs could register with the NRF as available but not be reachable by a particular consumer NF is avoided. In addition, producer NF instances that appear as being unhealthy to some SCPs may appear as healthy to other SCPs. The endpoint and service name combinations are only marked as unhealthy by the SCPs to which the endpoint and service name combinations appear as unhealthy. Other SCPs who do not see the producer NF instances as unhealthy can still reach the producer NF instances. As are result, producer NF utilization is improved over an implementation where producer NF instances are marked as being unhealthy globally.

NRF 100 includes NRF discovery request handler 706 that receives discovery requests, parses the discovery requests for unhealthy endpoint and service name combinations, and formulates discovery response messages to exclude service profiles of producer NF instances corresponding to the endpoint and service name combinations that have been marked as unhealthy by SCP 101. Thus, NRF discovery request handler 706 generates lists of service profiles that are SCP-region specific in terms of reachability of the producer NF instances corresponding to the service profiles. NRF discovery request handler 706 may be implemented by computer executable instructions that are stored in memory 702 of NRF 100 and executed by processor 700 of NRF 100.

Figure 8:
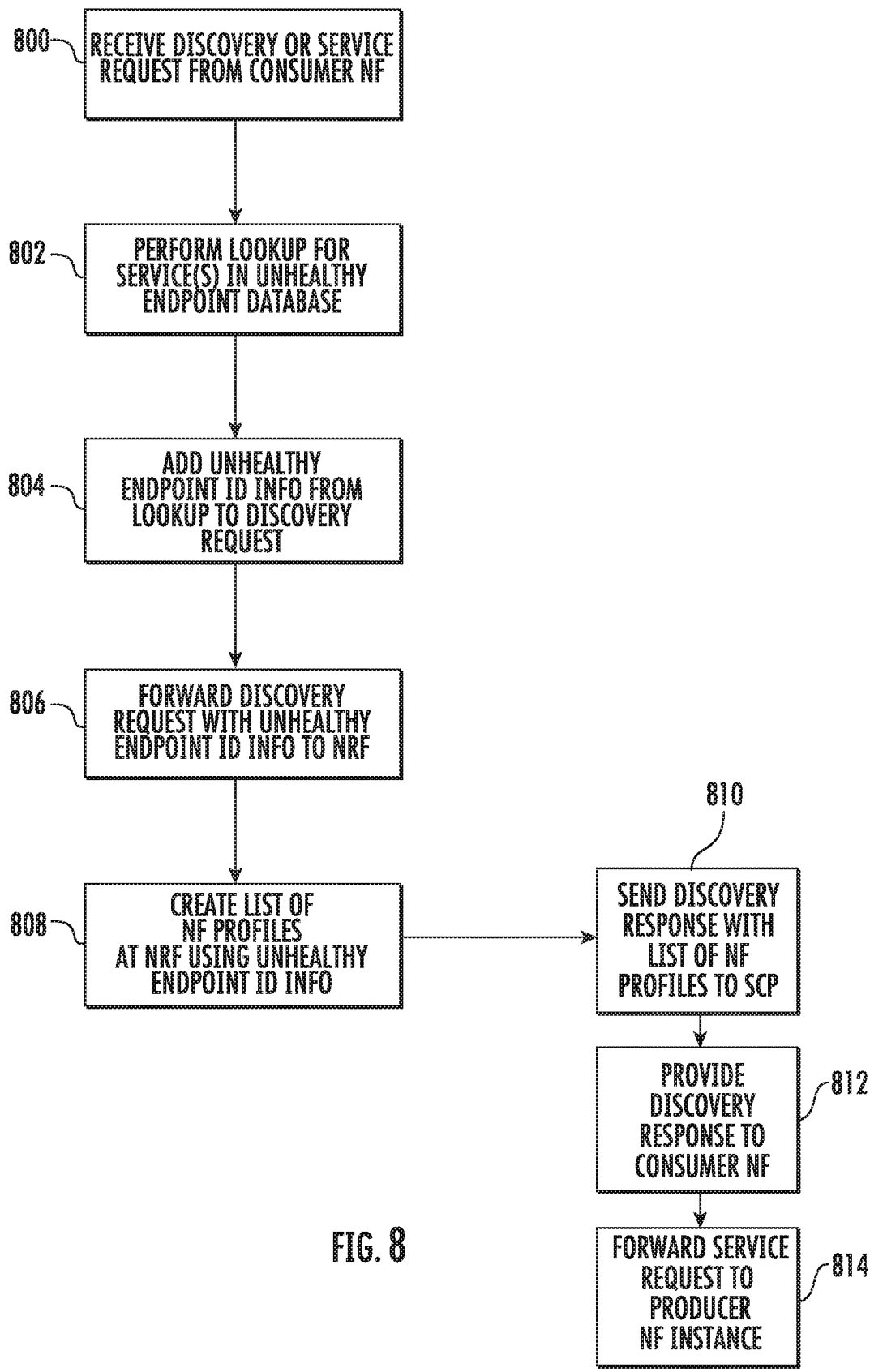
FIG. 8 is a flow chart illustrating an exemplary process for optimized routing using an NRF and an SCP.

FIG. 8 is a flow chart illustrating an exemplary process performed by SCP 101 and NRF 100 in performing optimized routing as described herein. Referring to FIG. 8, in step 800, a discovery request or a service request with a 3gpp-Sbi-Discovery header is received from a consumer NF. The discovery or service request may identify at least one service for which NF discovery is being requested (either directly by the consumer NF or indirectly in the case of delegated discovery).

In step 802, a lookup is performed in the unhealthy endpoint database. For example, SCP 101 may perform a lookup in database 500 for each service identified in the discovery or service request or generated based on the discovery or service request.

In step 804, unhealthy endpoint and service name combinations resulting from the lookup are added to the existing or new discovery request. For example, SCP 101 may add custom headers to the discovery request that identify each endpoint and service name combination identified as unhealthy based on the lookup in unhealthy endpoint database 500.

In step 806, the discovery request with the unhealthy endpoint and service name identification information is forwarded to the NRF. For example, SCP 101 may forward the modified discovery request to NRF 100.

In step 808, a list of service profiles is created at the NRF using the unhealthy endpoint and service name identification information provided in the discovery request. For example, in NRF 100 may generate an initial list of service profiles of endpoints based on the service identifier (outside of the custom headers in the discovery request message) and exclude or remove service profiles of endpoints from the list service profiles that have service name and endpoint combinations that are indicated by SCP 101 as being unhealthy.

In step 810, the discovery response with the list of service profiles is transmitted to the SCP. For example, NRF 100 may send a list of service profiles that has been filtered to remove service profiles of producer NF instances corresponding to endpoint and service name combinations identified as unhealthy to SCP 101.

In step 812, the process includes providing the list to a consumer NF. Step 812 would only occur in the case of non-delegated discovery where the SCP receives a discovery request from a consumer NF and forwards the discovery request to the NRF. In the case of delegated discovery where the SCP does not receive a discovery request from the consumer NF but instead receives a service request, step 812 is not performed. In step 812, for the case of non-delegated discovery, SCP 101 may forward the discovery response including the list of service profiles of producer NF instances to a consumer NF that sent the initial discovery request to SCP 101.

In step 814, process includes forwarding a service request to a producer NF instance. The service request may be the same service request received in step 800 in the case of delegated discovery. The service request may be a new service request received from a consumer NF in the case of non-delegated discovery. In either case, SCP 101 forwards the request to one of the producer NF instances whose service profile is in the filtered list of service profiles, and the likelihood of the SCP having to perform producer NF re-selection is reduced.

The disclosure of each of the following references is hereby incorporated herein by reference in its entirety:

REFERENCES 1. 3GPP TS 23.501; $3^{rd}$ Generation Partnership Project; Technical Specification Group Services and System Aspects; System architecture for the 5G System (5GS), Stage 2 (Release 16) V16.4.0 (2020-03)
2. 3GPP TS 23.502; $3^{rd}$ Generation Partnership Project; Technical Specification Group Services and System Aspects; Procedures for the 5G System (5GS), Stage 2 (Release 16) (2020-03) V16.4.0 (2020-03)
3. 3GPP TS 29.510; $3^{rd}$ Generation Partnership Project; Technical Specification Group Core Network and Terminals; 5G System; Network Function Repository Services; Stage 3 (Release 16), V16.4.0 (2020-07)
4. 3GPP TS 29.500; $3^{rd}$ Generation Partnership Project; Technical Specification Group Core Network and Terminals; 5G System; Technical Realization of Service Based Architecture; Stage 3 (Release 16), V16.4.0 (2020-06)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for optimized network function (NF) discovery and routing using an NF repository function (NRF) and a service communications proxy (SCP), the method comprising:

at the SCP, receiving a discovery request message or generating a discovery request message based on a received service request message with a 3gpp-Sbi-Discovery header;

modifying, by the SCP, the discovery request message to identify as unhealthy at least one endpoint and service name combination associated with a producer NF instance capable of providing a service identified in the discovery or service request message;

forwarding, by the SCP, the modified discovery request message to the NRF;

at the NRF, creating a list of service profiles of producer NF instances capable of providing the service identified in the modified discovery request message;

excluding, by the NRF and from the list, at least one service profiles of at least one producer NF instance corresponding to the at least one endpoint and service name combination identified as unhealthy in the modified discovery request message; and forwarding, by the NRF and to the SCP, a discovery response message including the list of service profiles of producer NF instances.

2. The method of claim 1 comprising, at the SCP, maintaining an unhealthy endpoint database and wherein modifying the discovery request message includes:
performing a lookup in the unhealthy endpoint database using a service name included in or derived from the service or discovery request message;
locating a record in the unhealthy endpoint database corresponding to the service name identified in or derived from the service or discovery request message;
extracting the endpoint from the record; and
inserting the endpoint and the service name into the discovery request message.

3. The method of claim 2 wherein inserting the endpoint and service name into the discovery request message includes inserting the endpoint and service name into a custom header of the discovery request message.

4. The method of claim 2 wherein maintaining the unhealthy endpoint database includes, in response to a determination that a producer NF instance associated with an endpoint and service name combination is unhealthy:
determining whether a record corresponding to the service name and endpoint combination exists in the unhealthy endpoint database;
in response to determining that a record corresponding to the endpoint and service name combination does not exist in the unhealthy endpoint database, adding a record corresponding to the endpoint and service name combination to the unhealthy endpoint database;
inserting a timestamp in the record; and
starting a cleanup timer for the record.

5. The method of claim 4 comprising, detecting expiration of the cleanup timer, and, in response, deleting the record corresponding to the endpoint and service name combination from the unhealthy endpoint database.

6. The method of claim 1 wherein creating the list of service profiles of producer NF instances includes extracting, by the NRF, a service name parameter from the modified discovery request message, identifying service profiles of producer NF instances capable of providing the service identified by the service name parameter, and including the service profiles of the producer NF instances capable of providing the service identified by the service name parameter in the list.

7. The method of claim 6 wherein excluding the at least one service profile of the at least one producer NF instances from the list includes removing, from the list, at least one service profile corresponding to the at least one service name and endpoint combinations identified as unhealthy in the modified discovery request message received from the SCP.

8. The method of claim 1 wherein the at least one service profile excluded from the list includes at least one service profiles of at least one producer NF instance having connectivity with the NRF and being unreachable from the SCP.

9. The method of claim 1, at the SCP, in response to the discovery response message, forwarding the discovery response message to a consumer NF.

10. The method of claim 1 wherein receiving a discovery or service request message includes receiving a service request message indicating delegated discovery and further comprising, at the SCP, after receiving the discovery response message, forwarding the service request message to one of the producer NF instances having a service profile in the list.

11. A system for optimized network function (NF) discovery and routing, the system comprising:
a service communications proxy (SCP) including at least one processor;
an NF repository function (NRF) including at least one processor;
an SCP discovery/service request handler and database manager implemented by the at least one processor of the SCP for receiving a discovery request message or generating a discovery request message based on a received service request message with a 3gpp-Sbi-Discovery header, modifying the discovery request message to identify as unhealthy at least one endpoint and service name combination associated with at least one producer NF capable of providing a service identified in the discovery or service request message, and forwarding, by the SCP, the modified discovery request message to the NRF; and
an NRF discovery request handler implemented by the at least one processor of the NRF for receiving the modified discovery request message, creating a list of service profiles of producer NF instances capable of providing the service identified in the modified discovery request message, excluding, from the list, at least one service profiles of at least one producer NF instance corresponding to the at least one endpoint and service name combination identified as unhealthy in the modified discovery request message, and forwarding, to the SCP, a discovery response message including the list of service profiles of producer NF instances.

12. The system of claim 11 comprising an unhealthy endpoint database located at the SCP and wherein the SCP discovery/service request handler and database manager is configured to modify the discovery request message by:
performing a lookup in the unhealthy endpoint database using a service name included in or derived from the discovery request or the service request message with the 3gpp-Sbi-Discovery header;
locating a record in the unhealthy endpoint database corresponding to the service identified in or derived from the discovery request message or the service request message with the 3gpp-Sbi-Discovery header;
extracting the endpoint from the record; and
inserting the service name and the endpoint into the discovery request message.

13. The system of claim 12 wherein the SCP discovery/service request handler and database manager is configured to insert the endpoint and the service name into a custom header of the discovery request message.

14. The system of claim 12 wherein the SCP discovery/service request handler and database manager is configured to, in response to a determination that a producer NF instance associated with an endpoint and service name combination is unhealthy:
determine whether a record corresponding to the endpoint and service name combination exists in the unhealthy endpoint database;
in response to determining that a record corresponding to the service name and endpoint combination does not exist in the unhealthy endpoint database, add a record corresponding to the service name and endpoint combination to the unhealthy endpoint database;
insert a timestamp in the record; and
start a cleanup timer for the record.

15. The system of claim 14 wherein the SCP discovery/service request handler and database manager is configured to detect expiration of the cleanup timer, and, in response, delete the record corresponding to the service name and endpoint combination from the unhealthy endpoint database.

16. The system of claim 11 wherein the NRF discovery request handler is configured to extract a service name parameter from the modified discovery request message, identify service profiles of producer NF instances capable of providing the service identified by the service name parameter, and include the service profiles of the producer NF instances capable of providing the service identified by the service name parameter in the list.

17. The system of claim 16 wherein excluding the at least one service profile corresponding to the at least one endpoint and service name combination identified as unhealthy from the list includes removing the at least one service profile from the list.

18. The system of claim 11 wherein the at least one service profile excluded from the list includes at least one service profile of at least one producer NF instance having connectivity with the NRF but that are unreachable from the SCP.

19. The system of claim 11 wherein the SCP discovery/service request handler and database manager is configured to receive the discovery response message, forward the discovery response message to a consumer NF, or, in response to receiving the service request message and the service request message indicating delegated discovery, the SCP discovery/service request handler is configured to forward the service request message to one of the producer NF instances having a service profile identified in the list.

20. A non-transitory computer readable medium having stored thereon executable instructions that when executed by a processor of a computer control the computer to perform steps comprising:
- at a service communications proxy (SCP), receiving a discovery request message or generating a discovery request message based on a received service request message with a 3gpp-Sbi-Discovery header;
- modifying, by the SCP, the discovery request message to identify as unhealthy at least one endpoint and service name combination associated with at least one producer network function (NF) instance capable of providing a service identified in the discovery or service request message with the 3gpp-Sbi-Discovery header;
- forwarding, by the SCP, the modified discovery request message to an NF repository function (NRF);
- at the NRF, creating a list of service profiles of producer NF instances capable of providing the service identified in the modified discovery request message;
- excluding, by the NRF and from the list, at least one service profile of at least one producer NF instance corresponding to the at least one endpoint and service name combination identified as unhealthy in the modified discovery request message; and
- forwarding, by the NRF and to the SCP, a discovery response message including the list of service profiles of producer NF instances.

* * * * *

UNITED STATES PATENT AND TRADEMARK OFFICE
CERTIFICATE OF CORRECTION

PATENT NO. : 11,290,549 B2
APPLICATION NO. : 17/001599
DATED : March 29, 2022
INVENTOR(S) : Krishan It is certified that error appears in the above-identified patent and that said Letters Patent is hereby corrected as shown below:

On the Title Page

On page 2, Column 2, Item (56) under Other Publications, Line 12, delete "Systems" and insert -- System --, therefor.

On page 3, Column 2, Item (56) under Other Publications, Line 30, delete "http" and insert -- https --, therefor.

On page 3, Column 2, Item (56) under Other Publications, Line 31, delete "hotedge18" and insert -- hotedge18/hotedge18 --, therefor.

On page 3, Column 2, Item (56) under Other Publications, Line 37, delete "http" and insert -- https --, therefor.

On page 3, Column 2, Item (56) under Other Publications, Line 48, delete "IEFT" and insert -- IETF --, therefor.

On page 3, Column 2, Item (56) under Other Publications, Line 55, delete "Netwok" and insert -- Network --, therefor.

In the Drawings

On sheet 8 of 9, in FIG. 7, under Reference Numeral 101, Line 8, delete "CONSUMMER" and insert -- CONSUMER --, therefor.

In the Specification

In Column 6, Line 42, delete "SOP;" and insert -- SCP; --, therefor.

In Column 9, Line 57, delete "network" and insert -- network) --, therefor.

Signed and Sealed this
Sixteenth Day of August, 2022

Katherine Kelly Vidal
*Director of the United States Patent and Trademark Office*

In Column 10, Line 3, delete "(RURI)," and insert -- (RURI)), --, therefor.

In Column 16, Line 24, delete "(5GS)," and insert -- (5GS); --, therefor.

In Column 16, Line 28, delete "(5GS)," and insert -- (5GS); --, therefor.